(12) United States Patent
Vook et al.

(10) Patent No.: US 10,805,020 B2
(45) Date of Patent: Oct. 13, 2020

(54) METHOD AND APPARATUS FOR IMPLEMENTING FRAMEWORK FOR ENHANCED CHANNEL FEEDBACK

(71) Applicant: Nokia Technologies Oy, Espoo (FI)

(72) Inventors: Frederick Vook, Schaumburg, IL (US); Eugene Visotsky, Buffalo Grove, IL (US); Xiaoyi Wang, Hoffman Estates, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/322,606

(22) PCT Filed: Aug. 9, 2016

(86) PCT No.: PCT/CN2016/094123
§ 371 (c)(1),
(2) Date: Feb. 1, 2019

(87) PCT Pub. No.: WO2018/027531
PCT Pub. Date: Feb. 15, 2018

(65) Prior Publication Data
US 2019/0181968 A1   Jun. 13, 2019

(51) Int. Cl.
*H04B 7/0456* (2017.01)
*H04B 7/0417* (2017.01)
*H04W 24/08* (2009.01)
*H04B 17/336* (2015.01)
(Continued)

(52) U.S. Cl.
CPC ......... *H04B 17/336* (2015.01); *H04B 7/0417* (2013.01); *H04B 7/0452* (2013.01);
(Continued)

(58) Field of Classification Search
CPC .............. H04B 17/336; H04B 17/0417; H04B 17/0452; H04B 17/0469; H04B 17/0634;
(Continued)

(56) References Cited

U.S. PATENT DOCUMENTS

| 2006/0009189 A1* | 1/2006 | Kim | ............... H04B 7/0626 455/403 |
| 2009/0322613 A1* | 12/2009 | Bala | ............... H04B 7/022 342/373 |

(Continued)

FOREIGN PATENT DOCUMENTS

| CN | 104012019 A | 8/2014 |
| WO | 2016/026512 A1 | 2/2016 |

OTHER PUBLICATIONS

International Search Report and Written Opinion received for corresponding Patent Cooperation Treaty Application No. PCT/CN2016/094123, dated Mar. 29, 2017 12 pages.

*Primary Examiner* — Candal Elpenord
(74) *Attorney, Agent, or Firm* — Squire Patton Boggs (US) LLP

(57) ABSTRACT

A method and apparatus may include measuring a space frequency downlink channel matrix. The space frequency downlink channel matrix reflects a channel response observed by the apparatus. The apparatus receives transmissions from an array of antennas of a network node. The method can also include determining a spatial channel vector. The method can also include determining scalar phase terms. The method can also include determining a Signal-to-Interference-Plus-Noise-Ratio scalar factor of the channel response observed by the apparatus. The method can also include transmitting an encoded form of the spatial channel vector. The method can also include transmitting an encoded form of the Signal-to-Interference-Plus-Noise-Ratio scalar factor. The method can also include transmitting an encoded form of the scalar phase terms.

20 Claims, 5 Drawing Sheets

(51) Int. Cl.
  *H04B 7/06* (2006.01)
  *H04B 7/0452* (2017.01)
(52) U.S. Cl.
  CPC ......... *H04B 7/0469* (2013.01); *H04B 7/0634* (2013.01); *H04W 24/08* (2013.01); *H04B 7/0626* (2013.01); *H04B 7/0632* (2013.01)
(58) Field of Classification Search
  CPC .. H04B 7/0417; H04B 7/0452; H04B 7/0469; H04B 7/0634; H04B 7/0626; H04B 7/0632; H04W 24/02; H04W 24/04; H04W 24/08
  See application file for complete search history.

(56) References Cited

U.S. PATENT DOCUMENTS

| | | | |
|---|---|---|---|
| 2012/0162012 A1* | 6/2012 | Marzouki | G01S 3/72 342/378 |
| 2012/0289275 A1 | 11/2012 | Li et al. | |
| 2014/0286291 A1* | 9/2014 | Einhaus | H04B 7/024 370/329 |
| 2014/0301492 A1* | 10/2014 | Xin | H04B 7/0456 375/267 |
| 2014/0341048 A1* | 11/2014 | Sajadieh | H04L 65/607 370/252 |
| 2015/0003548 A1* | 1/2015 | Thomas | H04B 7/0617 375/267 |
| 2016/0021551 A1* | 1/2016 | Park | H04B 7/0619 370/328 |
| 2016/0119097 A1* | 4/2016 | Nam | H04L 5/0023 370/329 |
| 2016/0142117 A1* | 5/2016 | Rahman | H04B 7/0469 375/267 |
| 2016/0156397 A1* | 6/2016 | Onggosanusi | H04L 5/005 370/252 |
| 2016/0218782 A1* | 7/2016 | Janis | H04B 7/0469 |
| 2017/0005712 A1* | 1/2017 | Jiang | H04B 7/065 |
| 2018/0034519 A1* | 2/2018 | Rahman | H04B 7/0456 |
| 2018/0351621 A1* | 12/2018 | Wei | H04B 7/0478 |
| 2019/0149211 A1* | 5/2019 | Nilsson | H04B 7/0626 |

\* cited by examiner

METHOD AND APPARATUS FOR IMPLEMENTING FRAMEWORK FOR ENHANCED CHANNEL FEEDBACK

RELATED APPLICATION

This application was originally filed as Patent Cooperation Treaty Application No. PCT/CN2016/094123 filed Aug. 9, 2016.

BACKGROUND

Field

Certain embodiments of the present invention relate to implementing a framework for enhanced channel feedback.

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method can include measuring, by a user equipment, a space frequency downlink channel matrix. The space frequency downlink channel matrix reflects a channel response observed by the user equipment. The user equipment receives transmissions from an array of antennas of a network node. The method can also include determining a spatial channel vector. The method can also include determining scalar phase terms. The method can also include determining a Signal-to-Interference-Plus-Noise-Ratio scalar factor of the channel response observed by the user equipment. The method can also include transmitting an encoded form of the spatial channel vector. The method can also include transmitting an encoded form of the Signal-to-Interference-Plus-Noise-Ratio scalar factor. The method can also include transmitting an encoded form of the scalar phase terms.

In the method of the first embodiment, the measuring includes measuring a space frequency matrix that reflects interference that the user equipment detects on the downlink.

In the method of the first embodiment, the array of antennas include cross-polarized antennas.

In the method of the first embodiment, the spatial channel vector is constant across an entire frequency bandwidth.

In the method of the first embodiment, the scalar phase terms are constant within a sub-band.

In the method of the first embodiment, the transmitting comprises transmitting to the network node, wherein the network node comprises an evolved Node B.

According to a second embodiment, an apparatus can include measuring means to measure a space frequency downlink channel matrix. The space frequency downlink channel matrix reflects a channel response observed by the apparatus. The apparatus receives transmissions from an array of antennas of a network node. The apparatus can also include first determining means to determine a spatial channel vector. The apparatus can also include second determining means to determine scalar phase terms. The apparatus can also include third determining means to determine a Signal-to-Interference-Plus-Noise-Ratio scalar factor. The apparatus can also include first transmitting means to transmit an encoded form of the spatial channel vector. The apparatus can also include second transmitting means to transmit an encoded form of the Signal-to-Interference-Plus-Noise-Ratio scalar factor. The apparatus can also include third transmitting means to transmit an encoded form of the scalar phase terms.

In the apparatus of the second embodiment, the measuring comprises measuring a space frequency matrix that reflects interference that the apparatus detects on the downlink.

In the apparatus of the second embodiment, the array of antennas comprise cross-polarized antennas.

In the apparatus of the second embodiment, the spatial channel vector is constant across an entire frequency bandwidth.

In the apparatus of the second embodiment, the scalar phase terms are constant within a sub-band.

In the apparatus of the second embodiment, the transmitting comprises transmitting to the network node, wherein the network node comprises an evolved Node B.

According to a third embodiment, a computer program product can be embodied on a non-transitory computer readable medium. The computer program product can be configured to control a processor to perform a method according to the first embodiment.

According to a fourth embodiment, a method includes transmitting, by a network node, channel state information—reference signals to a user equipment. The network node transmits from an array of antennas to the user equipment. The method also includes receiving an encoded form of a spatial channel vector. The method also includes receiving an encoded form of a Signal-to-Interference-Plus-Noise-Ratio scalar factor. The method also includes receiving an encoded form of scalar phase terms. The method also includes reconstructing an estimate of a space-frequency channel response based on the received spatial channel vector, the received scalar factor, and the received scalar phase terms. The method also includes determining transmit weights based on the received spatial channel vector, the received scalar factor, and the received scalar phase terms.

In the method of the fourth embodiment, the array of antennas comprises cross-polarized antennas.

In the method of the fourth embodiment, the spatial channel vector is constant across an entire frequency bandwidth.

In the method of the fourth embodiment, the scalar phase terms are constant within a sub-band.

In the method of the fourth embodiment, the transmitting comprises transmitting by an evolved Node B.

According to a fifth embodiment, an apparatus can include transmitting means to transmit channel state information—reference signals to a user equipment. The apparatus transmits from an array of antennas to the user equipment. The apparatus can also include first receiving means to receive an encoded form of a spatial channel vector. The apparatus also includes second receiving means to receive an encoded form of a Signal-to-Interference-Plus-Noise-Ratio scalar factor. The apparatus can also include third receiving means to receive an encoded form of scalar phase terms. The apparatus can also include reconstructing means to reconstruct an estimate of a space-frequency channel response based on the received spatial channel vector, the received scalar factor, and the received scalar phase terms. The apparatus can also include determining means to determine transmit weights based on the received spatial channel vector, the received scalar factor, and the received scalar phase terms.

In the apparatus of the fifth embodiment, the measuring comprises measuring a space frequency matrix that reflects interference that the user equipment detects on the downlink.

In the apparatus of the fifth embodiment, the array of antennas comprise cross-polarized antennas.

In the apparatus of the fifth embodiment, the spatial channel vector is constant across an entire frequency bandwidth.

In the apparatus of the fifth embodiment, the scalar phase terms are constant within a sub-band.

In the apparatus of the fifth embodiment, the transmitting comprises transmitting from an evolved Node B.

According to a sixth embodiment, a computer program product can be embodied on a non-transitory computer readable medium. The computer program product can be configured to control a processor to perform a method according to the fourth embodiment.

According to a seventh embodiment, an apparatus can include at least one processor. The apparatus can also include at least one memory including computer program code. The at least one memory and the computer program code can be configured, with the at least one processor, to cause the apparatus at least to measure a space frequency downlink channel matrix. The space frequency downlink channel matrix reflects a channel response observed by the apparatus. The apparatus receives transmissions from an array of antennas of a network node. The apparatus can also be caused to determine a spatial channel vector. The apparatus can also be caused to determine scalar phase terms. The apparatus can also be caused to determine a Signal-to-Interference-Plus-Noise-Ratio scalar factor of the channel response observed by the user equipment. The apparatus can also be caused to transmit an encoded form of the spatial channel vector. The apparatus can also be caused to transmit an encoded form of the Signal-to-Interference-Plus-Noise-Ratio scalar factor. The apparatus can also be caused to transmit an encoded form of the scalar phase terms.

According to an eighth embodiment, an apparatus can include at least one processor. The apparatus can also include at least one memory including computer program code. The at least one memory and the computer program code can be configured, with the at least one processor, to cause the apparatus at least to transmit channel state information—reference signals to a user equipment. The apparatus transmits from an array of antennas to the user equipment. The apparatus can also be caused to receive an encoded form of a spatial channel vector. The apparatus can also be caused to receive an encoded form of a Signal-to-Interference-Plus-Noise-Ratio scalar factor. The apparatus can also be caused to receive an encoded form of scalar phase terms. The apparatus can also be caused to reconstruct an estimate of a space-frequency channel response based on the received spatial channel vector, the received scalar factor, and the received scalar phase terms. The apparatus can also be caused to determine transmit weights based on the received spatial channel vector, the received scalar factor, and the received scalar phase terms.

BRIEF DESCRIPTION OF THE DRAWINGS

For proper understanding of the invention, reference should be made to the accompanying drawings, wherein.

DETAILED DESCRIPTION

Figure 1:
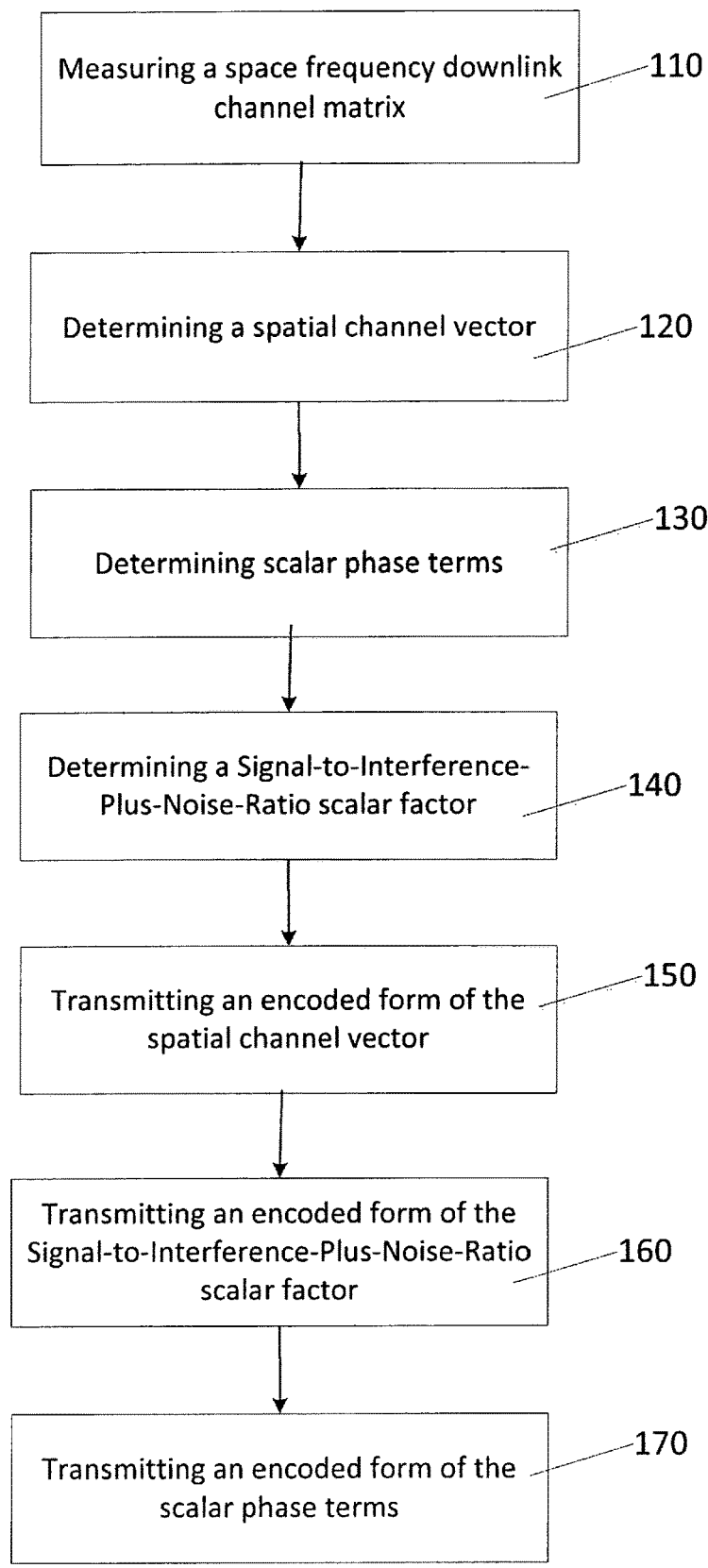
FIG. 1 illustrates a flowchart of a method in accordance with certain embodiments of the invention.

Certain embodiments of the present invention are directed to providing an evolved Node B (eNB) with accurate downlink channel state information (CSI), in order to improve the performance of Single User (SU) Multiple Input Multiple Output (MIMO) and Multi-User (MU) MIMO. The eNB may be communicating with user equipment via large scale antenna arrays. Large scale antenna arrays are currently being studied in 3GPP under two work efforts: the Enhanced Full-Dimension-Multiple-Input-Multiple-Output (eFD-MIMO) work item and the New Radio Access Technology (RAT) (NR) study item. The eFD-MIMO study item is directed to Release 14, and the study item has an agenda item on advanced Channel State Information (CSI) feedback.

The NR study item is considered to be a 5G study item and is aimed at Release 15 and beyond. The NR study item will address carrier frequencies of up to 100 GHz, and large scale antenna arrays are expected to be a key component of the NR systems.

The performance of Single User (SU) MIMO and Multi-User (MU) MIMO on the downlink may be affected by the quality (e.g., timeliness and accuracy) of the Channel State Information (CSI) received at the eNB. SU-MIMO attempts to obtain a coherent processing gain and also a spatial multiplexing gain for one user at a time. MU-MIMO attempts to send information to multiple users at a given time.

With MU-MIMO, the best performance is generally achieved when transmit weights can effectively point a maximum response of an array towards a spatial channel of a desired user, while pointing nulls towards the spatial channel of other paired users, thereby minimizing an amount of multi-user cross-talk at the user equipment (UEs).

In general, the performance of MU-MIMO is also affected by the accuracy of link adaptation, but MU-MIMO performance tends to be far more sensitive, far more affected, by the quality of the CSI, as compared to SU-MIMO.

Problems in providing high-quality CSI include: (1) providing channel information from all transmitting antennas to all receiving antennas may be difficult, (2) tracking time variations in a spatial channel response may be difficult, and/or (3) tracking frequency selectivity of the spatial channel response may be difficult.

Certain embodiments of the present invention propose a new explicit CSI feedback quantization scheme. Certain embodiments provide a feedback that includes a full space-frequency matrix that reflects channel response (observed by UE antennas). Certain embodiments provide a feedback of a full space-frequency matrix, instead of providing an observed Channel State Information (CSI) for each transmitting antenna of an evolved Node B (eNB). A full space-frequency matrix can also be scaled to reflect the interference that the UE detects on the downlink.

The feedback (of a space frequency matrix that reflects channel responses for UE antennas) can replace a Rank Indicator as well as Channel Quality Indicator (CQI). The interference can be reflected within the full space-frequency matrix as a scaling factor of the overall channel response.

Details of the CSI feedback quantization scheme are described below. With regard to a channel encoding framework, with certain embodiments, there may be an array of cross polarized antennas. For example, there may be a 1D array of $M_{tx}$ antennas at the eNB that is transmitting to, for example, a two-antenna UE. With other examples, the UE may be a multiple-antenna UE. The eNB antenna elements can be configured such that the first set of $M_{tx}/2$ antenna elements of the eNB are of one polarization (+45), and the second set of $M_{tx}/2$ antenna elements are of another polarization (−45). The actual channel matrix at a subcarrier k between each transmitting (eNB) antenna and each receiving (UE) antenna can be expressed as follows:

$$H(k) = \begin{bmatrix} h_1^+(k) & h_2^+(k) \\ h_1^-(k) & h_2^-(k) \end{bmatrix} \quad (1)$$

where $H(k)$ is $M_{tx} \times 2$, and an index for the time dependency has been omitted. In this example, the UE is assumed to have 2 receiving antennas. Each vector component in $H(k)$, $h_1^+(k)$, $h_2^+(k)$, for example, is $M_{tx}/2 \times 1$. In the feedback idea of certain embodiments, the downlink channel can be approximated as follows:

$$\hat{H}(k) = \begin{bmatrix} \emptyset_1^+(k)h & \emptyset_2^+(k)h \\ \emptyset_1^-(k)h & \emptyset_2^-(k)h \end{bmatrix} = kron\left( \begin{bmatrix} \emptyset_1^+(k) & \emptyset_2^+(k) \\ \emptyset_1^-(k) & \emptyset_2^-(k) \end{bmatrix}, h \right) \quad (2)$$

where h is $M_{tx}/2$ and is assumed to be fixed (a constant) in the bandwidth over which the channel is being approximated. The four terms $\emptyset_1^+(k), \emptyset_2^+(k), \emptyset_1^-(k)$ and $\emptyset_2^-(k)$ are scalars and are dependent on k. The idea behind this approximation is that the spatial channel vector (between a given set of co-polarized eNB elements and a UE receiving antenna) includes a phase term multiplied by a single underlying spatial channel vector h. The underlying spatial channel vector h is the same for all UE receiving antennas and for both sets of co-polarized elements at the eNB.

With this approximation of the channel response, the UE would measure the downlink channel response over the bandwidth of interest and would then compute the set of {h, $\emptyset_1^+(k), \emptyset_2^+(k), \emptyset_1^-(k)$ and $\emptyset_2^-(k)$} in (2) that best approximates the measured H(k) over the bandwidth of interest. The set of quantities in (2) would then be encoded for incorporation into a feedback message to be sent to the eNB. The eNB would then receive the encoded quantities and compute SU-MIMO or MU-MIMO transmit weights based on the encoded quantities.

In the above approximation, the vector term h is assumed to be constant with frequency, whereas the four scalar phase terms $\emptyset_1^+(k), \emptyset_2^+(k), \emptyset_1^-(k)$ and $\emptyset_2^-(k)$ are assumed to vary with frequency subcarrier k. However, in the context of the existing 3GPP/LTE feedback framework, the four scalar terms could be assumed to be constant within a sub-band, whereas the single vector term h could be assumed to be constant across the entire frequency bandwidth. For a given sub-band b, the channel approximation given in (2) would then be re-written as:

$$\hat{H}(b) = \begin{bmatrix} \emptyset_1^+(b)h & \emptyset_2^+(b)h \\ \emptyset_1^-(b)h & \emptyset_2^-(b)h \end{bmatrix} = kron\left( \begin{bmatrix} \emptyset_1^+(b) & \emptyset_2^+(b) \\ \emptyset_1^-(b) & \emptyset_2^-(b) \end{bmatrix}, h \right) \quad (3)$$

where the variable b indicates a sub-band rather than a sub-carrier, and b=1 . . . B. B is the total number of sub-bands. This approximation is then providing a channel estimate that is constant within, a sub-band, but varies from sub-band to sub-band.

With regard to computing h and $\emptyset_i^{+/-}(k)$, determining the scalar phase terms and the vector terms in (2) can be performed by UE. One option for computing these terms is outlined below, given the measured channel response over the bandwidth of interest H(k), k=1 . . . BK, where K is the total number of subcarriers in a sub-band, and B is the number of sub-bands in the bandwidth of interest (and BK is the total number of subcarriers in the overall system bandwidth). The first step would be to solve h as the eigenvector that corresponds to the largest eigenvalue of a particular covariance matrix, where two possibilities are outlined below.

Certain embodiments can define the following wideband covariance matrices for I=1, 2, and j=1, 2 (i.e., in the event of 2 UE Receiving antennas):

$$R_{ij}^+ = \frac{1}{K} \sum_{k=1}^{BK} h_i^+(k) h_j^{+H}(k) \quad (4)$$

$$R_{ij}^- = \frac{1}{K} \sum_{k=1}^{BK} h_i^+(k) h_j^{+H}(k) \quad (5)$$

where superscript H indicates conjugate transpose. The first option is to compute h to be the largest eigenvector of the $M_{tx}/2 \times M_{tx}/2$ covariance matrix $R_a$, where $R_a$ is defined:

$$R_a = \frac{1}{4}(R_{11}^+ + R_{22}^+ + R_{11}^- + R_{22}^-) \quad (6)$$

The second option is to compute h as the largest eigenvector of the $M_{tx}/2 \times M_{tx}/2$ covariance matrix $R_b$, where $R_b$ is defined as:

$$R_b = \frac{1}{8}(R_{11}^+ + R_{22}^+ + R_{12}^+ + R_{21}^+ + R_{11}^- + R_{22}^- + R_{12}^- + R_{21}^-) \quad (7)$$

The difference between these two options is that the first option explicitly assumes $R_{ij}^+=0$ and $R_{ij}^-=0$, when i≠j (which assumes that the channel vectors to different receiving antennas are independent).

Once the h has been determined, certain embodiments determine the scalar terms on a sub-band basis to minimize the mean square error between the measured channel H(k) and the approximated channel as expressed in (2), on the subcarriers in the sub-band of interest.

As described below, certain embodiments focus on one sub-band of interest (sub-band b), and consider the mean square error (MSE) between the measured channel H(k) and the approximated channel $\hat{H}(k)$. Given the structure in (1) compared with (3), certain embodiments can solve for the scalar terms separately to minimize the mean square error:

$$MSE(\emptyset_i^p(b)) = \frac{1}{K} \sum_{k=(b-1)K+1}^{bK} |h_i^p(k) - \emptyset_i^p(b)h|^2 \qquad (8)$$

where p={+,−}, (b−1)K+1 ... bK is the set of carriers in sub-band b (b=1 ... B, where B is the total number of sub-bands), and K is the number of subcarriers in each sub-band.

The solution is:

$$\emptyset_i^p(b) = \frac{\frac{1}{K} \sum_{k=(b-1)K+1}^{bK} h^H h_i^p(k)}{h^H h}, \text{ for } p = \{+, -\}, i = \{1, 2\} \qquad (9)$$

With regard to the feedback framework, certain embodiments of the present invention are directed to a feedback framework that will impact the feedback procedures/messaging in the current standard.

With regard to wideband feedback, if wideband feedback is in place, then the vector and scalar components of the channel approximation become wideband quantities (constant across the band), which means they would be computed based on the channel across the entire signal bandwidth.

With regard to sub-band feedback, if sub-band feedback is in place, then the h vector can be a wideband quantity (constant across the signal bandwidth of interest), whereas the scalar components could be sub-band-based quantities (and would vary from sub-band to sub-band within the signal bandwidth of interest).

With regard to encoding the vector component h, certain embodiments may be directed to a codebook option. The codebook option may define a codebook for h, and the UE would feedback a Pre-coding Matrix Indicator (PMI) that corresponds to the best h for the band. A frequency-selection option may define a collection of multiple h vectors, and may then define a selection codebook that varies across the band that will select a different h per sub-band. This option would provide a way to track the vector component across the band in a manner that is similar to the way W2 selects and co-phases the columns of W1 in the Release 10 8-TX codebook.

With regard to scalar quantization (gain/phase per element), the entries of h can each be encoded with some number of bits for gain and some number of bits for phase.

With an option for 2D arrays, if a 2D cross-polarization array is used, then the h vector could be decomposed into the kronecker product of an azimuth vector $h_{az}$ and an elevation vector $h_{el}$. The azimuth and elevation vectors can be quantized with the above mentioned encoding options.

With regard to an encoding of the scalar components $\emptyset_1^+(k)$, $\emptyset_2^+(k)$, $\emptyset_1^-(k)$ and $\emptyset_2^-(k)$, a codebook can be defined to specify the 2×M, (for $M_r$ UE receive antennas) matrix containing the $\emptyset_1^+(k)$, $\emptyset_2^+(k)$, $\emptyset_1^-(k)$ and $\emptyset_2^-(k)$, etc. The feedback would then be an indicator of which matrix of $\emptyset_1^+(k)$, $\emptyset_2^+(k)$, etc., is the preferred matrix.

Alternatively, scalar quantization can be performed for each of the scalar quantities in (2). Each term would be encoded with some number of bits for gain and some number of bits for phase.

In order to enable the base to compute rank and Channel Quality Indication (CQI), the base needs to be able to scale the downlink channel response to account for the noise & interference seen by the UE. Two options are listed. A first option may normalize the above components to provide a unit average power space-frequency matrix channel response and then feedback a separate SINR-scaling factor. A second option may compute the above components so that the average power in the space-frequency matrix channel response corresponds to SINR that the UE sees on the DL.

The proposed channel encoding and feedback framework of certain embodiments may provide certain benefits. For example, certain embodiments may enable the eNB to compute a full downlink channel, a preferred rank, and a CQI for a user for SU-MIMO transmission.

With MU-MIMO transmission, the knowledge of the full channel response combined with the SINR scaling factor may enable cross-talk prediction, which should enable improved MU-MIMO CQI.

Certain embodiments of the present invention may provide advantages over Uplink (UL) SRS. UL-SRS generally requires the UE to transmit Sounding Reference Signals (SRS) on all antennas used for receiving. Typically, the UEs have one Transmitting (TX) branch and no means to switch among the multiple antennas. The result is that UL SRS would not provide the base with the full matrix downlink channel.

UL-SRS leverages UL/DL channel reciprocity, but the interference is generally not reciprocal. As such, CQI prediction with UL-SRS is problematic. With the method of certain embodiments, the UE can scale the feedback to account for the interference seen on the DL.

Certain embodiments of the present invention may provide advantages over codebook feedback. Codebooks may suffer from quantization effects where the set of codebooks cannot completely span the entire space of required precoders (because the set of precoders in the codebook may be finite). The method of certain embodiments may provide the base with a full channel knowledge and the CQI so that the base can predict the best rank and (in the case of MU transmission) the MU cross-talk.

FIG. 1 illustrates a flowchart of a method in accordance with certain embodiments of the invention. The method may include, at 110, measuring, by a user equipment, a space frequency downlink channel matrix. The space frequency downlink channel matrix reflects a channel response observed by the user equipment, and the user equipment receives transmissions from an array of antennas of a network node (e.g., eNB). The method also includes, at 120, determining a spatial channel vector. The method also includes, at 130, determining scalar phase terms. The method also includes, at 140, determining a Signal-to-Interference-Plus-Noise-Ratio scalar factor of the channel response observed by the user equipment. The method also includes, at 150, transmitting an encoded form of the spatial channel vector. The method also includes, at 160, transmitting an encoded form of the Signal-to-Interference-Plus-Noise-Ratio scalar factor. The method also includes, at 170, transmitting an encoded form of the scalar phase terms.

Figure 2:
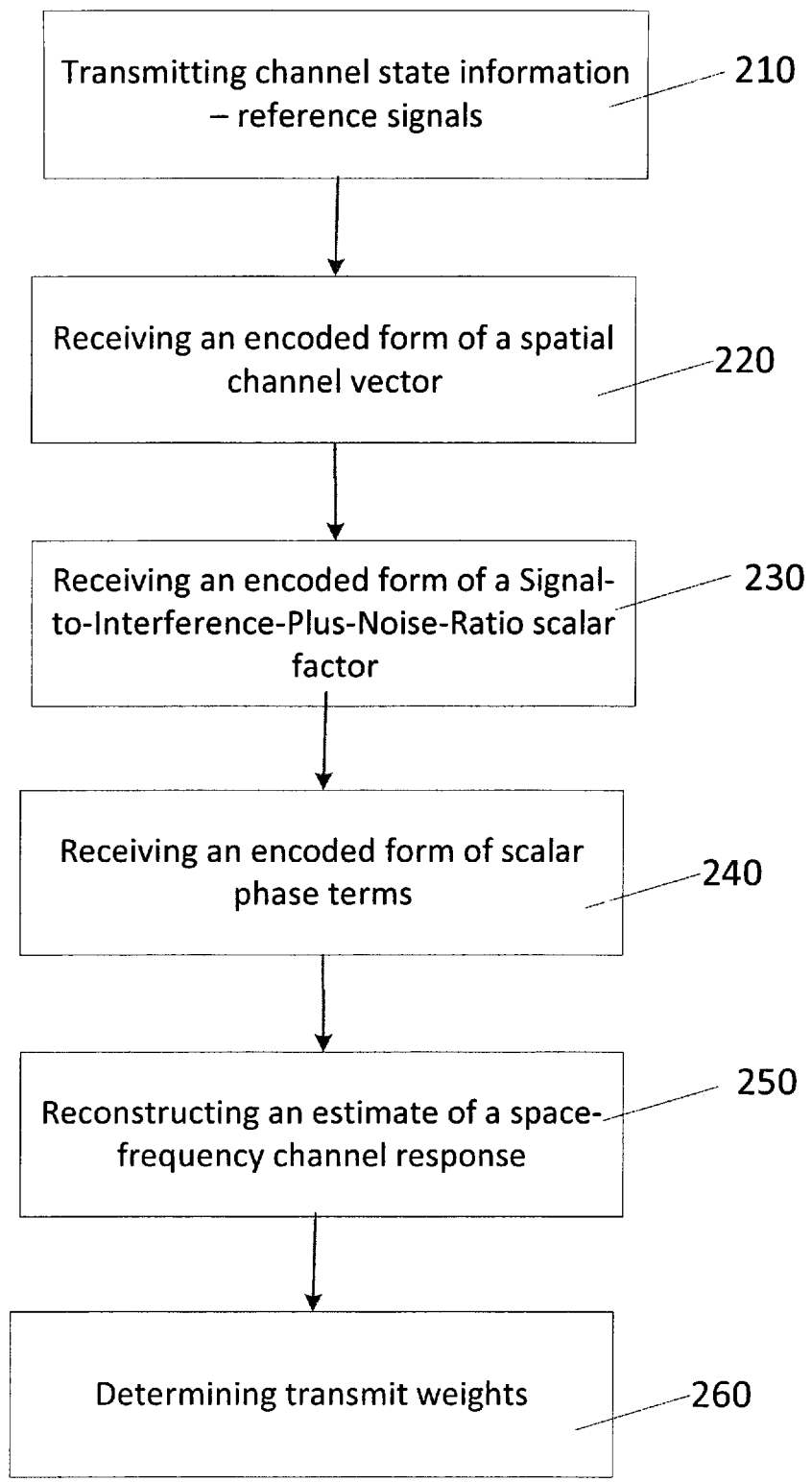
FIG. 2 illustrates a flowchart of a method in accordance with certain embodiments of the invention.

FIG. 2 illustrates a flowchart of another method in accordance with certain embodiments of the invention. The method may include, at 210, transmitting, by a network node, channel state information—reference signals (CSI-RS) to a user equipment, and the network node transmits from an array of antennas to the user equipment. The method may also include, at 220, receiving an encoded form of a spatial channel vector. The method may also include, at 230, receiving an encoded form of a Signal-to-Interference-Plus-Noise-Ratio scalar factor. The method may also include, at 240, receiving an encoded form of scalar phase terms. The method may also include, at 250, reconstructing an estimate of a space-frequency channel response based on the received spatial channel vector, the received scalar factor, and the received scalar phase terms. The method may also include, at 260, determining transmit weights based on the received spatial channel vector, the received scalar factor, and the received scalar phase terms.

Figure 3:
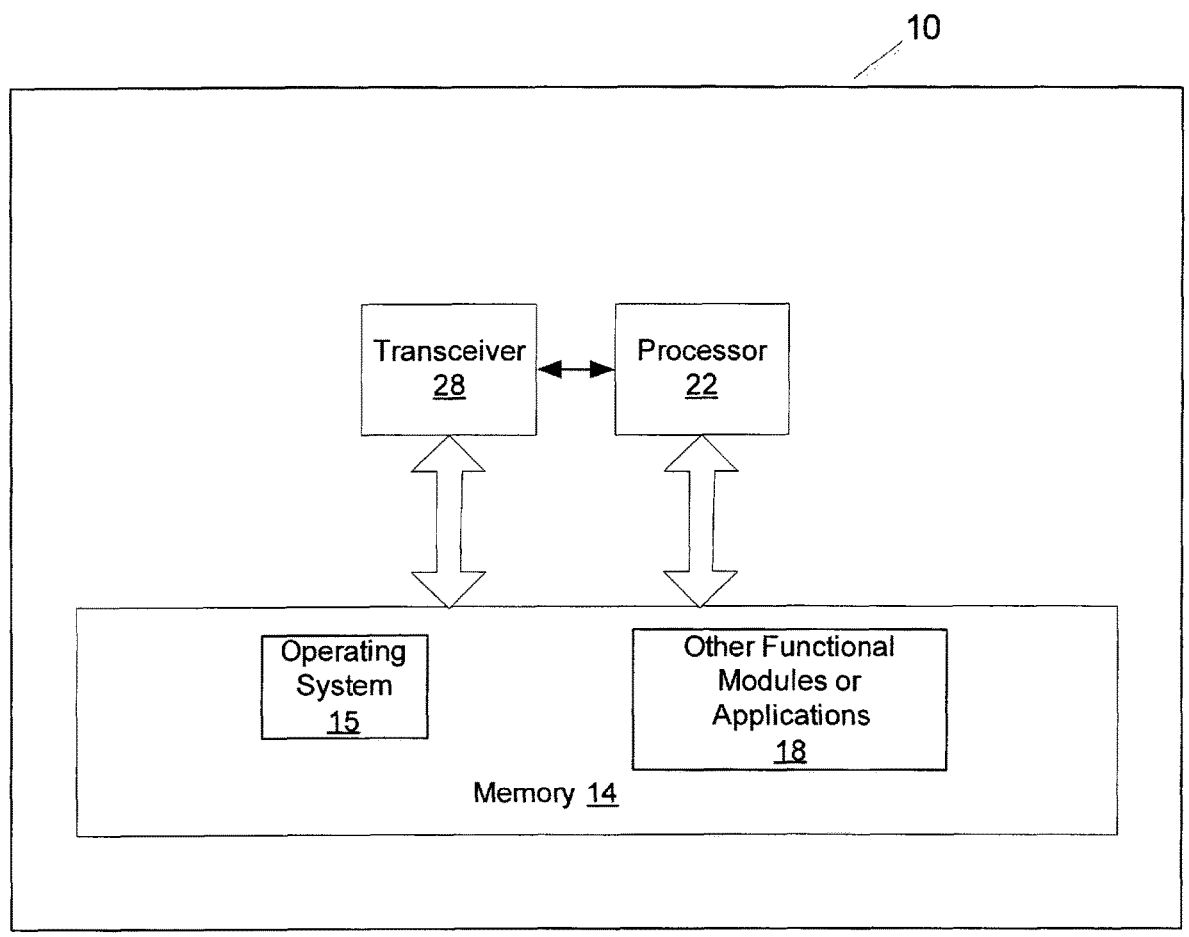
FIG. 3 illustrates an apparatus in accordance with certain embodiments of the invention.

FIG. 3 illustrates an apparatus in accordance with certain embodiments of the invention. In one embodiment, the apparatus can be a network node such as an evolved Node B and/or base station, for example. In another embodiment, the apparatus may correspond to a user equipment, for example. Apparatus 10 can include a processor 22 for processing information and executing instructions or operations. Processor 22 can be any type of general or specific purpose processor. While a single processor 22 is shown in FIG. 3, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 may include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 4:
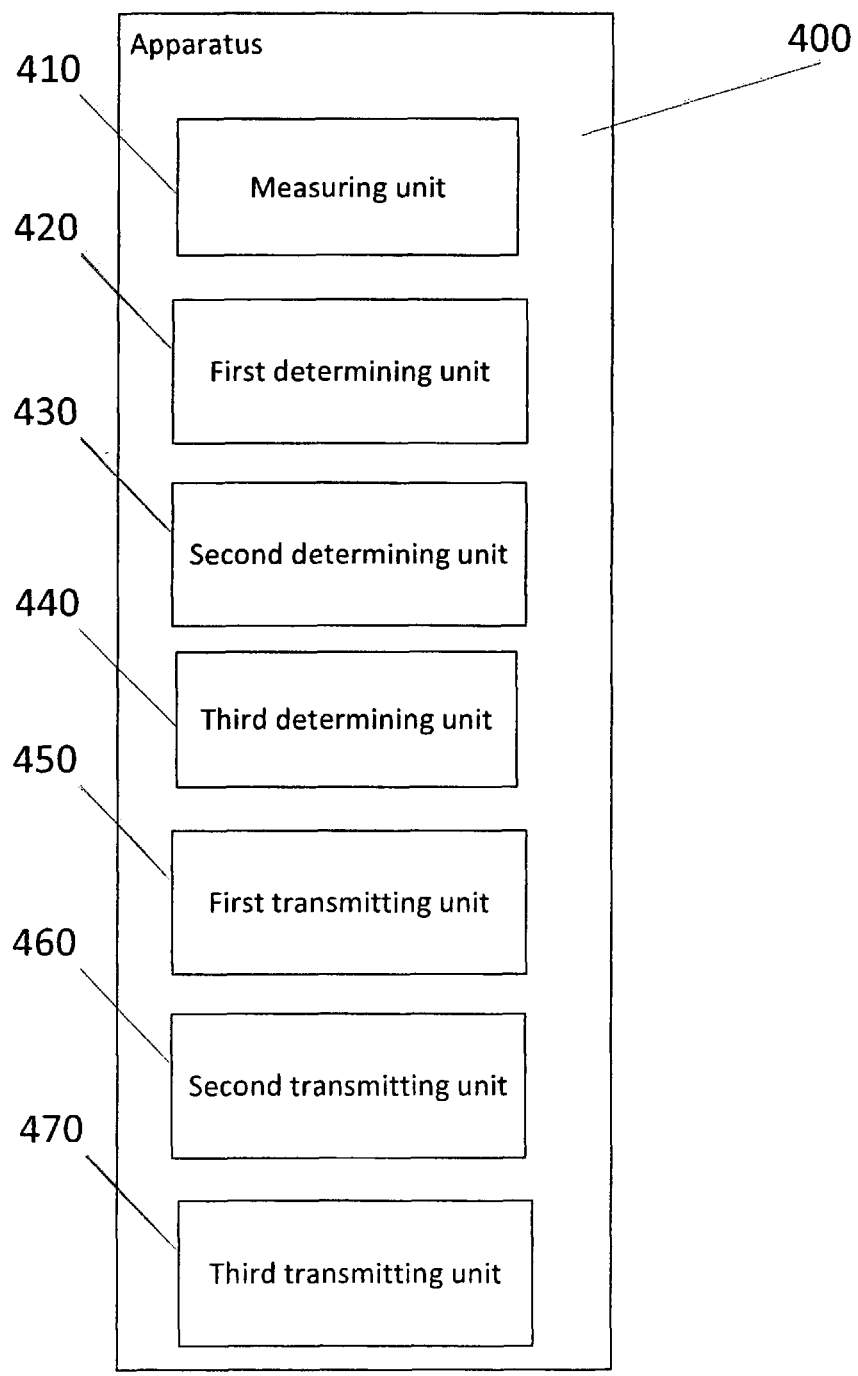
FIG. 4 illustrates an apparatus in accordance with certain embodiments of the invention.

FIG. 4 illustrates an apparatus in accordance with certain embodiments of the invention. Apparatus 400 can be a user equipment, for example. Apparatus 400 can include a measuring unit 410 that measures a space frequency downlink channel matrix. The space frequency downlink channel matrix reflects a channel response observed by apparatus 400. Apparatus 400 receives transmissions from an array of antennas of a network node. Apparatus 400 also includes a first determining unit 420 that determines a spatial channel vector. Apparatus 400 also includes a second determining unit 430 that determines scalar phase terms. Apparatus 400 also includes a third determining unit 440 that determines a Signal-to-Interference-Plus-Noise-Ratio scalar factor of the channel response observed by apparatus 400. Apparatus 400 also includes a first transmitting unit 450 that transmits an encoded form of the spatial channel vector. Apparatus 400 also includes a second transmitting unit 460 that transmits an encoded form of the Signal-to-Interference-Plus-Noise-Ratio scalar factor. Apparatus 400 also includes a third transmitting unit 470 that transmits an encoded form of the scalar phase terms.

Figure 5:
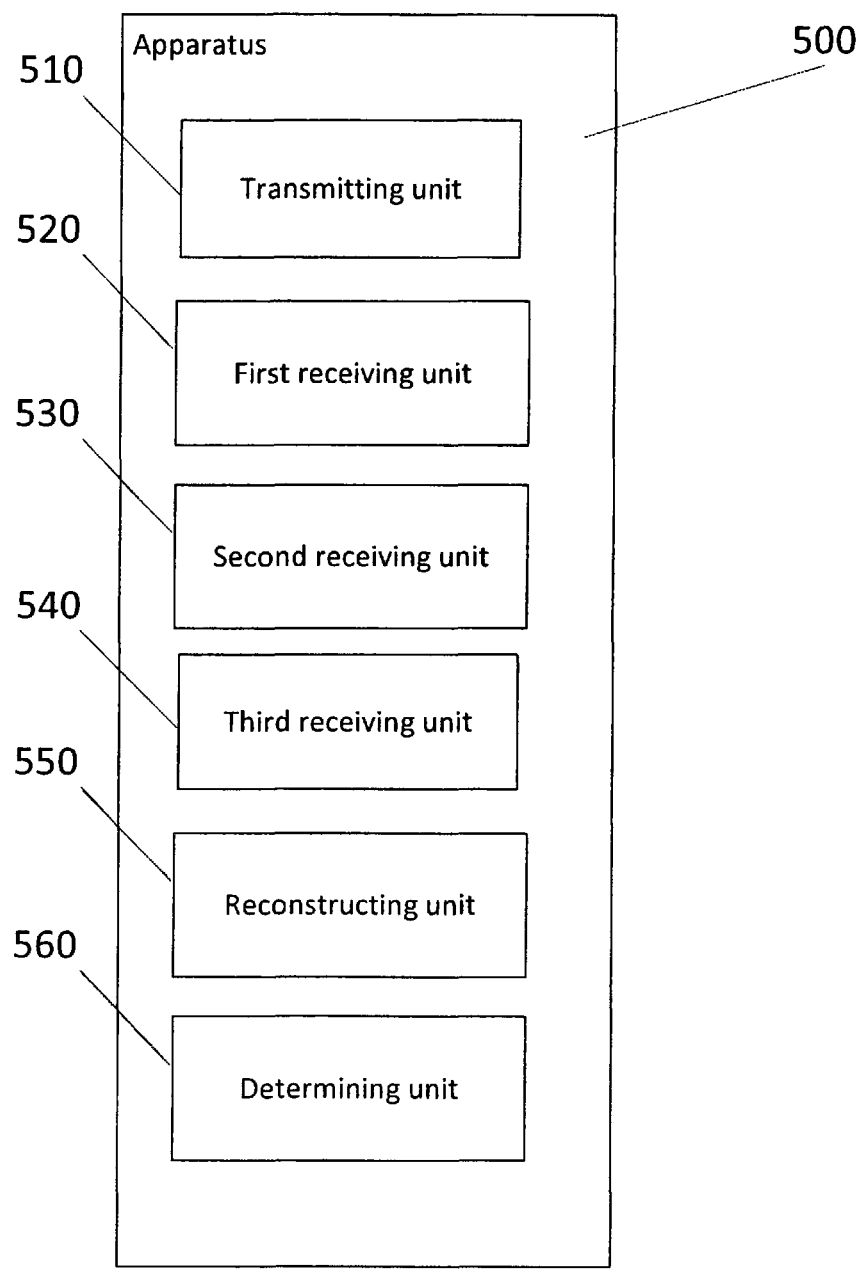
FIG. 5 illustrates an apparatus in accordance with certain embodiments of the invention.

FIG. 5 illustrates an apparatus in accordance with certain embodiments of the invention. Apparatus 500 can be a base station and/or eNB, for example. Apparatus 500 can include a transmitting unit 510 that transmits channel state information—reference signals to a user equipment. Apparatus 500 transmits from an array of antennas to the user equipment. Apparatus 500 also includes a first receiving unit 520 that receives an encoded form of a spatial channel vector. Apparatus 500 also includes a second receiving unit 530 that receives an encoded form of a Signal-to-Interference-Plus-Noise-Ratio scalar factor. Apparatus also includes a third receiving unit 540 that receives an encoded form of scalar phase terms. Apparatus 500 also includes a reconstructing unit 550 that reconstructs an estimate of a space-frequency channel response based on the received spatial channel vector, the received scalar factor, and the received scalar phase terms. Apparatus 500 also includes a determining unit 560 that determines transmit weights based on the received spatial channel vector, the received scalar factor, and the received scalar phase terms.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

What is claimed is:
1. A method, comprising:
  measuring, by a user equipment, a space frequency downlink channel matrix, wherein the space frequency downlink channel matrix reflects a channel response observed by each receiving antenna of the user equipment, and the user equipment receives transmissions from an array of antennas of a network node;

determining a spatial channel vector configured for decomposition into a Kronecker product of at least one azimuth vector and at least one elevation vector;

determining scalar phase terms;

determining a Signal-to-Interference-Plus-Noise-Ratio scalar factor of the channel response observed by the user equipment;

transmitting an encoded form of the spatial channel vector;

transmitting an encoded form of the Signal-to-Interference-Plus-Noise-Ratio scalar factor; and transmitting an encoded form of the scalar phase terms.

2. The method according to claim 1, wherein the measuring comprises measuring a space frequency matrix that reflects interference that the user equipment detects on the downlink.

3. The method according to claim 1, wherein the array of antennas comprises cross-polarized antennas.

4. The method according to claim 1, wherein the spatial channel vector is constant across an entire frequency bandwidth.

5. The method according to claim 1, wherein the scalar phase terms are constant within a sub-band.

6. An apparatus, comprising:

at least one processor; and at least one memory including computer program code;

the at least one memory and the computer program code configured to, with the at least one processor, cause the apparatus at least to:

measure a space frequency downlink channel matrix, wherein the space frequency downlink channel matrix reflects a channel response observed by each receiving antenna of the apparatus, and the apparatus receives transmissions from an array of antennas of a network node;

determine a spatial channel vector configured for decomposition into a Kronecker product of at least one azimuth vector and at least one elevation vector;

determine scalar phase terms;

determine a Signal-to-Interference-Plus-Noise-Ratio scalar factor;

transmit an encoded form of the spatial channel vector;

transmit an encoded form of the Signal-to-Interference-Plus-Noise-Ratio scalar factor; and transmit an encoded form of the scalar phase terms.

7. The apparatus according to claim 6, wherein the measuring comprises measuring a space frequency matrix that reflects interference that the apparatus detects on the downlink.

8. The apparatus according to claim 6, wherein the array of antennas comprises cross-polarized antennas.

9. The apparatus according to claim 6, wherein the spatial channel vector is constant across an entire frequency bandwidth.

10. The apparatus according to claim 6, wherein the scalar phase terms are constant within a sub-band.

11. A method, comprising:

transmitting, by a network node, channel state information-reference signals to a user equipment, wherein the network node transmits from an array of antennas to the user equipment;

receiving an encoded form of a spatial channel vector configured for decomposition into a Kronecker product of at least one azimuth vector and at least one elevation vector and associated with a channel response observed by each receiving antenna of the user equipment;

receiving an encoded form of a Signal-to-Interference-Plus-Noise-Ratio scalar factor;

receiving an encoded form of scalar phase terms;

reconstructing an estimate of a space-frequency channel response based on the received spatial channel vector, the received scalar factor, and the received scalar phase terms; and determining transmit weights based on the received spatial channel vector, the received scalar factor, and the received scalar phase terms.

12. The method according to claim 11, wherein the array of antennas comprises cross-polarized antennas.

13. The method according to claim 11, wherein the spatial channel vector is constant across an entire frequency bandwidth.

14. The method according to claim 11, wherein the scalar phase terms are constant within a sub-band.

15. An apparatus, comprising:

at least one processor; and at least one memory including computer program code;

the at least one memory and the computer program code configured to, with the at least one processor, cause the apparatus at least to:

transmit channel state information-reference signals to a user equipment, and the apparatus transmits from an array of antennas to the user equipment;

receive an encoded form of a spatial channel vector configured for decomposition into a Kronecker product of at least one azimuth vector and at least one elevation vector and associated with a channel response observed by each receiving antenna of the user equipment;

receive an encoded form of a Signal-to-Interference-Plus-Noise-Ratio scalar factor;

receive an encoded form of scalar phase terms;

reconstruct an estimate of a space-frequency channel response based on the received spatial channel vector, the received scalar factor, and the received scalar phase terms; and determine transmit weights based on the received spatial channel vector, the received scalar factor, and the received scalar phase terms.

16. The apparatus according to claim 15, wherein the measuring comprises measuring a space frequency matrix that reflects interference that the user equipment detects on the downlink.

17. The apparatus according to claim 15, wherein the array of antennas comprises cross-polarized antennas.

18. The apparatus according to claim 15, wherein the spatial channel vector is constant across an entire frequency bandwidth.

19. The apparatus according to claim 15, wherein the scalar phase terms are constant within a sub-band.

20. The apparatus according to claim 15, wherein the transmitting comprises transmitting from an evolved Node B.

* * * * *